United States Patent
Chen et al.

(10) Patent No.: US 7,358,013 B2
(45) Date of Patent: Apr. 15, 2008

(54) METHOD FOR MANUFACTURING CHOLESTERIC LIQUID CRYSTAL REFLECTIVE CODING PLATE

(75) Inventors: Wei-Chou Chen, Hsinchu (TW); Kei-Hsiung Yang, Taoyuan (TW)

(73) Assignee: Hannstar Display Corporation, Taipei (TW)

( * ) Notice: Subject to any disclaimer, the term of this patent is extended or adjusted under 35 U.S.C. 154(b) by 662 days.

(21) Appl. No.: 11/044,902

(22) Filed: Jan. 27, 2005

(65) Prior Publication Data

US 2006/0061698 A1 Mar. 23, 2006

(30) Foreign Application Priority Data

Sep. 22, 2004 (TW) .............................. 93128772 A

(51) Int. Cl.
*G02F 1/1335* (2006.01)
(52) U.S. Cl. ..................... 430/20; 430/321; 349/12
(58) Field of Classification Search ................... None
See application file for complete search history.

(56) References Cited

U.S. PATENT DOCUMENTS

| | | | |
|---|---|---|---|
| 6,642,977 B2 | 11/2003 | Kotchick et al. | |
| 6,721,030 B2 | 4/2004 | Hsieh et al. | |
| 6,727,967 B2 | 4/2004 | Nakamura et al. | |
| 6,753,044 B2 | 6/2004 | Faris et al. | |
| 2004/0046926 A1* | 3/2004 | Ishizaki | 349/194 |
| 2004/0234901 A1* | 11/2004 | Lee | 430/321 |

FOREIGN PATENT DOCUMENTS

EP 1 302 789 A1 * 4/2007

* cited by examiner

Primary Examiner—John A. McPherson
(74) Attorney, Agent, or Firm—Volpe and Koenig P.C.

(57) ABSTRACT

A method for manufacturing a reflective coding plate is provided. The method includes steps of providing a first substrate, forming a mixture layer on the first substrate, providing a second substrate on the mixture layer and thereby a sandwich structure is formed, performing an orientation process on the sandwich structure, providing a mask having a code pattern thereon on one side of the sandwich structure, exposing the side of the sandwich structure to a UV light, removing the second substrate, and removing an unreacted part of the mixture layer.

20 Claims, 5 Drawing Sheets

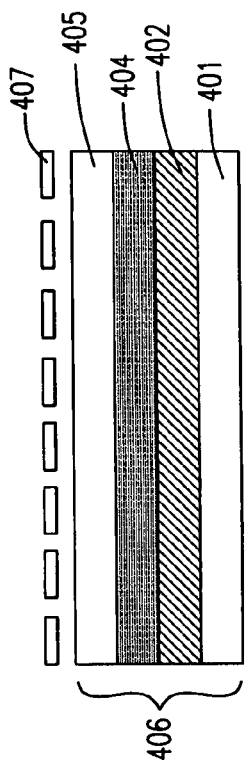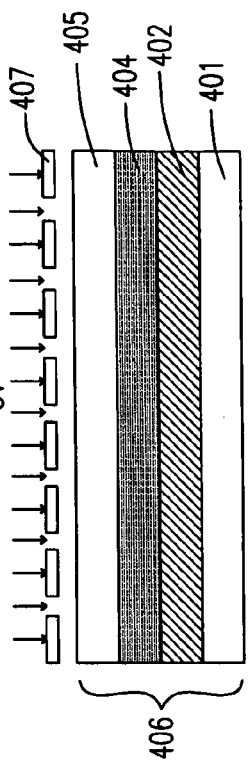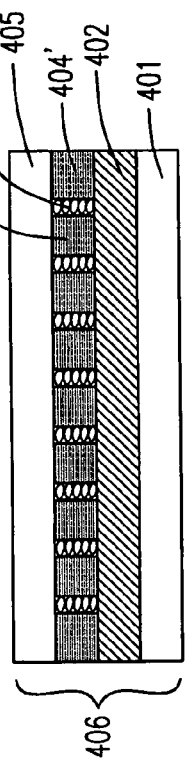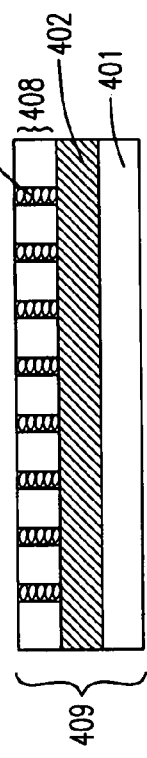
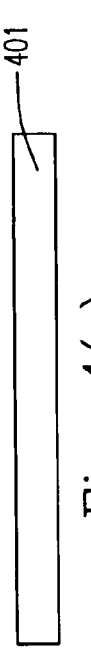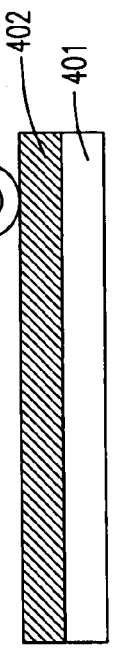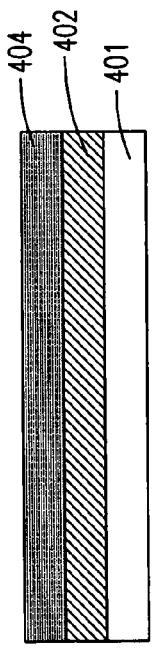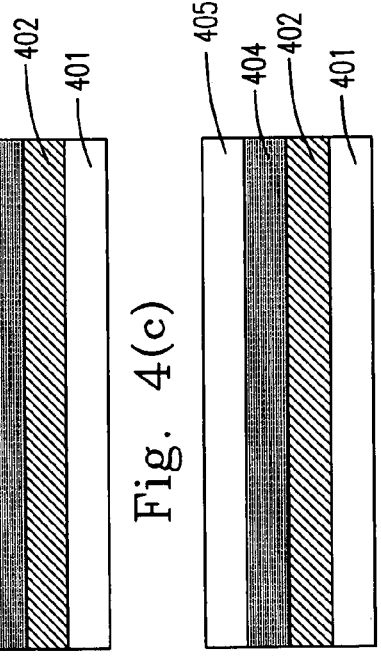

METHOD FOR MANUFACTURING CHOLESTERIC LIQUID CRYSTAL REFLECTIVE CODING PLATE

FIELD OF THE INVENTION

The present invention relates to a method for fabricating a touch panel, and more particularly, to a method for fabricating an optical sensor touch panel.

BACKGROUND OF THE INVENTION

The optical sensor touch panel and the relevant techniques thereto are revealed in the recent days. Such a touch panel has a matrix composed of light sources and detectors therein and the position of the input touch is detected via sensing the optical image. When an input touch is provided to the touch panel, the light from the light source would be obstructed and hence the detector corresponding thereto would not receive the signal. If the position which the detector does not receive the signal is determined, the position of the input touch would be identified accordingly.

Moreover, another kind of optical sensor touch panel is operated with an optical sensor pen, which includes a light transmitter and a light detector therein. The light transmitter of the optical sensor pen would transmit a light to the touch panel having a code pattern and the light detector would receive the light reflected therefrom. When the optical image is determined via the code pattern, the position of the input touch is able to be identified. Such a touch panel achieves the input detection in a short distance and has a great reflectivity which is beneficial to be integrated in a liquid crystal display (LCD) panel.

The optical sensor touch panel and the LCD panel are typically fabricated from the liquid crystal (LC). The cholesteric liquid crystal (CLC) substance has a similar spiral structure as the cholesteric molecules for the biomedical applications. The CLC substance has the optical activity, the ability for selectively optical-scattering and the dichroism for circular polarization, and moreover, the reflectivity for the lights having the similar optical activity is up to 50%. Therefore, the CLC substance is applied in several optical components for the LCD. The spontaneous alignment method for manufacturing the cholesteric reflective polarizer is disclosed in U.S. Pat. No. 6,721,030, wherein a lamination process is performed on the photopolymerized CLC substance, so that the photopolymerized CLC substance is oriented in a specific orientation for being a polarizer. Moreover, the coloring medium composed of the CLC microflake is disclosed in U.S. Pat. No. 6,753,044. The disclosed coloring medium has an improved brightness and color characteristics.

Based on the above discussions, for further taking advantage of the CLC substance, a method for manufacturing a coding plate for the optical touch panel is provided in the present invention. The coding plate is fabricated from the novel material, CLC substance, and is integrated into the LCD panel, so as to provide an input panel. The coding plate of the present invention has a great reflectivity, so that the optical performance of the input panel is maintained. Furthermore, the code pattern of the coding plate is also well protected thereby.

SUMMARY OF THE INVENTION

In accordance with a first aspect of the present invention, a method for manufacturing a reflective coding plate is provided. The method includes steps of providing a first substrate, forming a mixture layer on the first substrate, providing a second substrate on the mixture layer and thereby a sandwich structure is formed, performing an orientation process on the sandwich structure, providing a mask having a code pattern thereon on one side of the sandwich structure, exposing the side of the sandwich structure to a UV light, removing the second substrate; and removing an unreacted part of the mixture layer.

Preferably, the mixture layer comprises a cholesteric liquid crystal substance and an initiator.

In accordance with a second aspect of the present invention, a method for manufacturing a reflective coding plate is provided. The method includes steps of providing a first substrate, forming a first orientation film on the first substrate and performing a rubbing process thereon, forming a mixture layer on the first substrate which is rubbed, providing a second substrate on the mixture layer and thereby a sandwich structure is formed, performing a heat treatment process on the sandwich structure so that the cholesteric liquid crystal substance is oriented thereby, providing a mask having a code pattern thereon on one side of the sandwich structure, exposing the side of the sandwich structure to a UV light, removing the second substrate, and removing an unreacted part of the mixture layer.

Preferably, the mixture layer comprises a cholesteric liquid crystal substance and an initiator.

In accordance with a third aspect of the present invention, a method for manufacturing a reflective coding plate is provided. The method includes steps of providing a first substrate, forming a structure with a mixture layer on the first substrate, providing a mask having a code pattern thereon on one side of said structure, exposing the side of said structure to a UV light, and removing an unreacted part of the mixture layer.

Preferably, the mixture layer comprises a cholesteric liquid crystal substance and an initiator.

Furthermore, a pitch length of the cholesteric liquid crystal substance multiplied by an average refractive index of the cholesteric liquid crystal substance in foregoing inventions is in an infrared ray wavelength range between 700 nm to 1700 nm.

The foregoing and other features and advantages of the present invention will be more clearly understood through the following descriptions with reference to the drawings, wherein:

BRIEF DESCRIPTION OF THE DRAWINGS

FIG. 3 and FIGS. 4(a) to (h) are diagrams illustrating the method for manufacturing a reflective coding plate according to a second preferred embodiment of the present invention.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Please refer to FIG. 1 and FIGS. 2(a) to (h), which are diagrams illustrating the method for manufacturing a reflective coding plate according to a first preferred embodiment of the present invention. First, a first substrate 201 is provided as shown in the step 11 in FIG. 1 and in FIG. 2(a), and the first substrate 201 may be a TAC (Triacetate Cellulose) film. Second, the mixture layer 202, which is composed of a CLC (Cholesteric Liquid Crystal) substance and an initiator, is applied to the first substrate 201 via the slot die, the spin coating or the roll coating as shown in the step 12 in FIG. 1 and in FIG. 2(b), wherein the composition ratio of the CLC substance to the initiator is 99%:1%. The mixture layer 202 is subsequently covered with a second substrate 203, so that a sandwich structure 204 is formed as shown in the step 13 and in FIG. 2(c). Moreover, the second substrate 203 may be also a TAC film.

Figure 1:
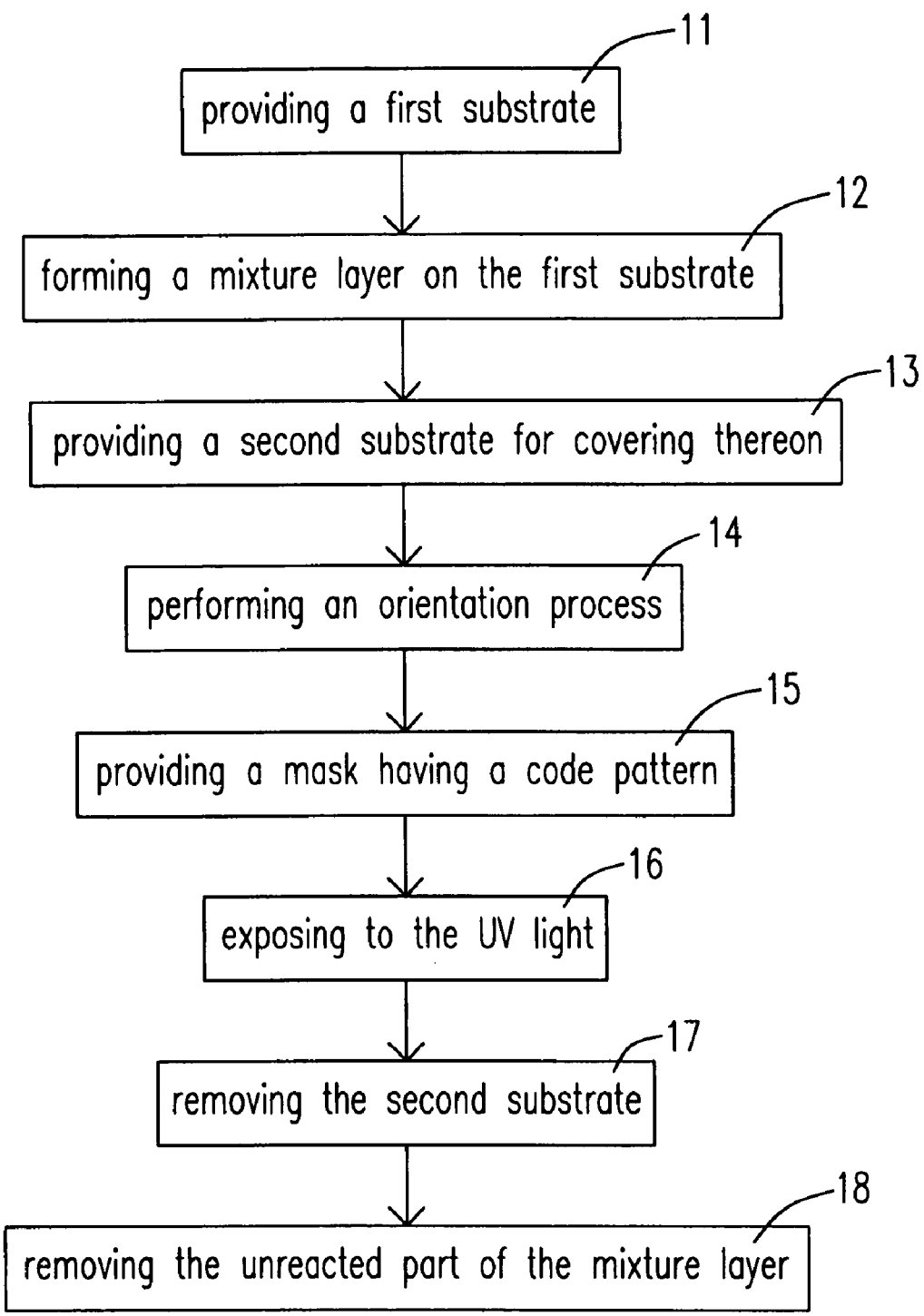
FIG. 1 and FIGS. 2(a) to (h) are diagrams illustrating the method for manufacturing a reflective coding plate according to a first preferred embodiment of the present invention.
Figure 2E:
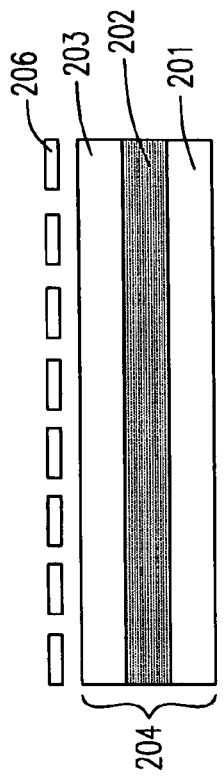
Figure 2F:
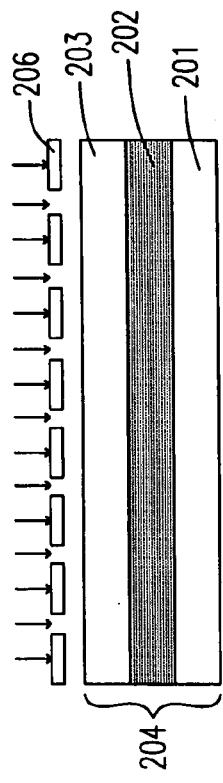
Figure 2G:
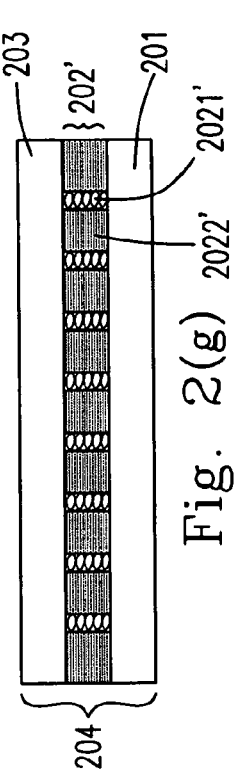
Figure 2H:
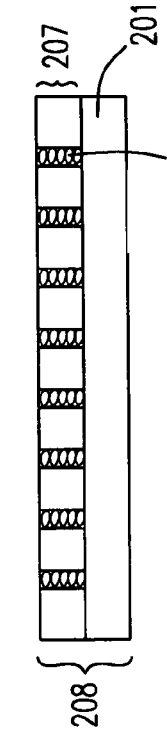
Figure 2A:
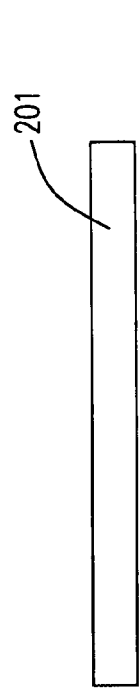
Figure 2B:
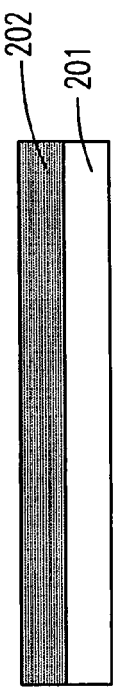
Figure 2C:
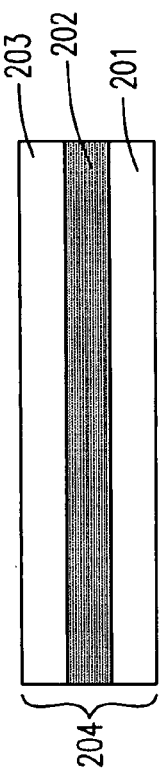
Figure 2D:
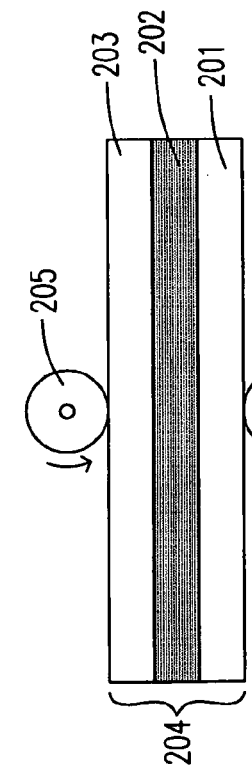

The sandwich structure 204 is oriented by a provided lamination apparatus 205 as shown in the step 14 in FIG. 1 and in FIG. 2(d). The lamination apparatus 205 provides a shear stress to the sandwich structure 204, so that the CLC substance therein is oriented. Then, a mask 206 having a code pattern thereon is provided on one side of the sandwich structure 204 as shown in the step 15 in FIG. 1 and in FIG. 2(e), and the side of the sandwich structure 204 is subsequently exposed to a energetic irradiation including UV light as shown in the step 16 in FIG. 1 and in FIG. 2(f).

The CLC substance in the mixture layer 202 is photopolymerized while being exposed to the UV light. When the UV light illuminates the mixture layer 202 through the mask 206, thereby one portion of the CLC substance is exposed to the UV light, and the other portion is shielded thereoff. The exposed portion of the CLC substance is photopolymerized, and hence the CLC polymer film 202' composed of the photopolymerized CLC polymer 2021' and the unphotopolymerized CLC substance 2022' is formed as shown in FIG. 2(g).

Then, the second substrate 203 is removed as shown in the step 17 in FIG. 1, and afterward, the unphotopolymerized CLC substance 2022' is washed and cleaned as shown in the step 18 in FIG. 1. A coding layer 207 composed of the photopolymerized CLC polymer 2021' and hence a reflective coding plate 208 having the coding layer 207 are formed as shown in FIG. 2(h).

Please refer to FIG. 3 and FIGS. 4(a) to (h), which are diagrams illustrating the method for manufacturing a reflective coding plate according to a second preferred embodiment of the present invention. First, a first substrate 401 is provided as shown in the step 31 in FIG. 3 and in FIG. 4(a), and the first substrate 401 may be a LCD (Liquid Crystal Display) panel, which has a color filter, but no polarizer attached thereon. Second, the color filter of the first substrate 401 is covered with an orientation film 402, and has a rubbing process via a roller 403 performed thereon, so that the first substrate 401 is oriented thereby as shown in the step 32 in FIG. 3 and in FIG. 4(b). Then, the mixture layer 404, which is composed of a CLC (Cholesteric Liquid Crystal) substance and an initiator, is applied to the first substrate 401 and the orientation film 402 via the slot die, the spin coating or the roll coating as shown in the step 33 in FIG. 3 and in FIG. 4(c), wherein the composition ratio of the CLC substance to the initiator is 99%:1%.

Similarly, the mixture layer 404 is subsequently covered with a second substrate 405, so that a sandwich structure 406 is formed as shown in the step 34 in FIG. 3 and in FIG. 4(d).

Moreover, the second substrate 405 is a glass substrate, which also has an orientation film thereon and is oriented via the rubbing process. The sandwich structure 406 is annealed as the step 35 in FIG. 3, so that the CLC substance of the mixture layer 404 is oriented and arranged thereby. A mask 407 having a code pattern thereon is subsequently provided on one side of the sandwich structure 406 as shown in the step 36 in FIG. 3 and in FIG. 4(e), and then the side of the sandwich structure 406 is exposed to a energetic irradiation including UV light as shown in the step 37 in FIG. 3 and in FIG. 4(f).

The CLC substance in the mixture layer 406 is photopolymerized while being exposed to the UV light. When the UV light illuminates the mixture layer 406 through the mask 407, thereby one portion of the CLC substance is exposed to the UV light, and the other portion is shielded thereoff. The exposed portion of the CLC substance is photopolymerized, and hence the CLC polymer film 404' composed of the photopolymerized CLC polymer 4041' and the unphotopolymerized CLC substance 4042' is formed as shown in FIG. 4(g).

Figure 3:
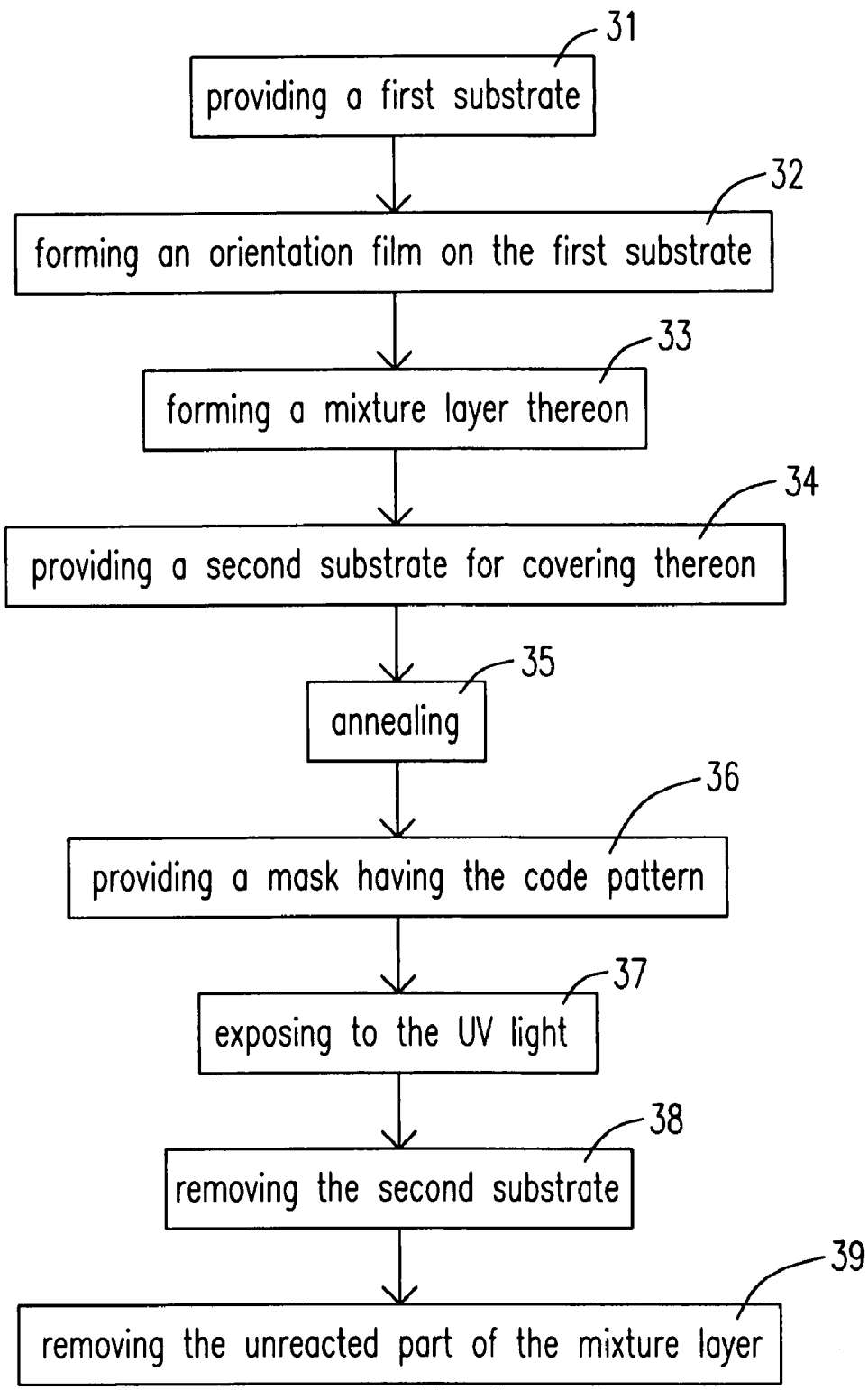

Then, the second substrate 405 is removed as shown in the step 38 in FIG. 3, and afterward the unphotopolymerized CLC substance 4042' is washed and cleaned as shown in step 39 in FIG. 3. A coding layer 408 composed of the photopolymerized CLC polymer 4041' and hence a reflective coding plate 409 having the coding layer 408 are formed as shown in FIG. 4(h).

Figure 5:
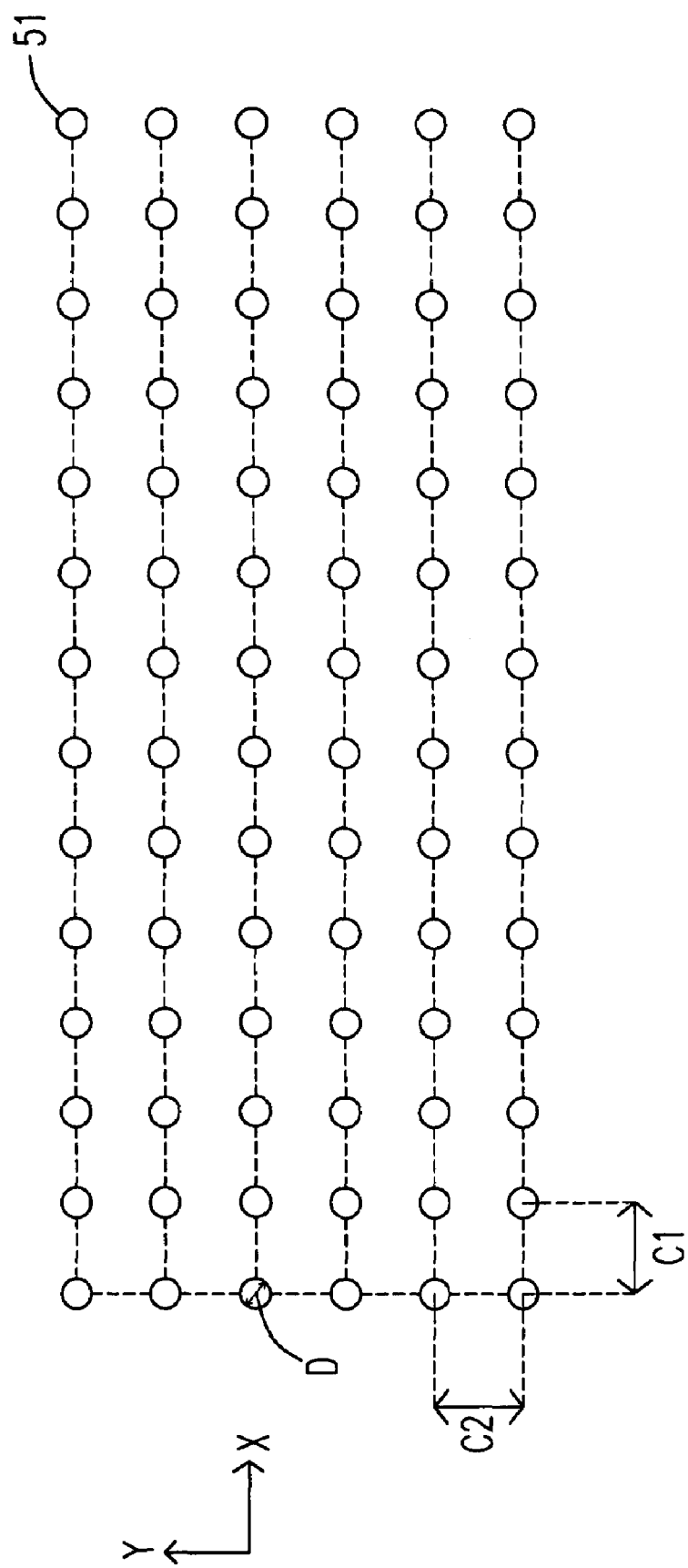
FIG. 5 is a diagram schematically illustrating the code pattern applied in the present invention.

Please refer to FIG. 5, which is a diagram schematically illustrating the typical code pattern applied in the present invention. The code pattern configured on the mask includes plural pattern units 51, which are arranged in columns and rows. In this case of the present invention, the pattern unit 51 is a circle having a diameter of D. The distance between the center of the circle and that of the adjacent one is a constant C1, which equals to 4 times of D, and the distance between two adjacent rows is also a constant C2 equaled to 3½ D. Furthermore, the diameter D is ranged in 5 to 100 μm.

According to the preferred embodiments of the present invention, the reflective coding plate is provided for the optical sensor touch panel which is suitable for sensing an infrared ray. Therefore, it is preferred that the pitch length of the CLC substance multiplied by the average refractive index thereof which is the wavelength of a light is ranged from 700 to 300,000 nm, especially from 700 to 1700 nm. Certainly, a value of 910 nm is the most preferable since the infrared ray exactly has a wavelength of 910 nm.

Since the photopolymerized CLC substance has a specific optical activity and a spiral structure, the light transmitted therethrough is separated into a left and a right circular polarized light and 50% of the light having the similar rotation is reflected thereby. Therefore, the CLC reflective coding plate of the present invention is able to precisely detect the reflective light and has an excellent performance. Such a provided CLC reflective coding plate is further integrated into the LCD panel, so as to fabricate an input panel therefrom. Moreover, the code for the coding plate is well protected by means of the present invention. Hence, the present invention not only has novelty and progressiveness, but also has an industry utility.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for manufacturing a reflective coding plate, comprising steps of:
   providing a first substrate;
   forming a mixture layer on said first substrate, wherein said mixture layer comprises a cholesteric liquid crystal substance and an initiator;
   providing a second substrate on said mixture layer, thereby a sandwich structure being formed;
   performing an orientation process on said sandwich structure;
   providing a mask having a code pattern thereon on one side of said sandwich structure;
   exposing said side of said sandwich structure to a UV light for forming a cholesteric liquid crystal polymer film with said code pattern;
   removing said second substrate; and
   removing an unreacted part of said mixture layer;
   wherein a pitch length of said cholesteric liquid crystal substance multiplied by an average refractive index of said cholesteric liquid crystal substance is in a wavelength range of an infrared ray.

2. The method according to claim 1, wherein said mixture layer is formed on said first substrate via one of a slot die, a spin coating and a roll coating.

3. The method according to claim 1, wherein the orientation process further comprises a step of applying a shear stress on said sandwich structure by a lamination apparatus.

4. The method according to claim 1, wherein said cholesteric liquid crystal polymer film with said code pattern is formed by photopolymerized.

5. The method according to claim 1, wherein said wavelength range is from 700 nm to 1700 nm.

6. A method for manufacturing a reflective coding plate, comprising steps of:
   providing a first substrate;
   forming a first orientation film on said first substrate, and performing a rubbing process thereon;
   forming a mixture layer on said first substrate which is rubbed, wherein said mixture layer comprises a cholesteric liquid crystal substance and an initiator;
   providing a second substrate on said mixture layer, thereby a sandwich structure being formed;
   performing a heat treatment process on said sandwich structure;
   providing a mask having a code pattern on one side of said sandwich structure;
   exposing said side of said sandwich structure to a UV light through said mask for forming a cholesteric liquid crystal polymer film with said code pattern;
   removing said second substrate; and
   removing an unreacted part of said mixture layer;
   wherein a pitch length of said cholesteric liquid crystal substance multiplied by an average refractive index of said cholesteric liquid crystal substance is in a wavelength range of an infrared ray.

7. The method according to claim 6, wherein said mixture layer is formed on said first substrate via one of a slot die, a spin coating and a roll.

8. The method according to claim 6, wherein said heat treatment comprises an annealing treatment.

9. The method according to claim 6, wherein said cholesteric liquid crystal polymer film with said code pattern is formed by photopolymerized.

10. The method according to claim 6, wherein said wavelength range is from 700 nm to 1700 nm.

11. A method for manufacturing a reflective coding plate, comprising steps of:
    providing a first substrate;
    forming a structure with a mixture layer on said first substrate, wherein said mixture layer comprises a cholesteric liquid crystal substance;
    providing a mask having a code pattern thereon on one side of said structure;
    exposing said side of said structure to a UV light through said mask for forming a cholesteric liquid crystal polymer film with said code pattern; and
    removing an unreacted part of said mixture layer;
    wherein a pitch length of said cholesteric liquid crystal substance multiplied by an average refractive index of said cholesteric liquid crystal substance is in a wavelength range of an infrared ray.

12. The method according to claim 11, wherein an orientation film is further formed on said first substrate, and a rubbing process is performed for forming a first oriented substrate.

13. The method according to claim 12, which further comprises a step of performing a heat treatment process on said structure for orienting said cholesteric liquid crystal substance.

14. The method according to claim 11, which further comprises a step of performing an orientation process via a second substrate on said mixture layer.

15. The method according to claim 14, which further comprises a step of forming an orientation film on said second substrate and performing a rubbing process for forming a second oriented substrate.

16. The method according to claim 15, which further comprises a step of performing a heat treatment process on said structure for orienting said cholesteric liquid crystal substance.

17. The method according to claim 14, wherein the orientation process further comprises a step of applying a shear stress applied on said second substrate and said structure by a lamination apparatus.

18. The method according to claim 14, further comprising a step of removing said second substrate and afterward removing the unreacted part of said mixture layer.

19. The method according to claim 11, wherein said cholesteric liquid crystal film with said code pattern is formed by photopolymerized.

20. The method according to claim 11 wherein said wavelength range is from 700 nm to 1700 nm.

* * * * *